Nov. 12, 1968  F. A. ZENZ  3,410,055
EXPANDABLE BED FILTER AND METHOD
Filed Oct. 25, 1966
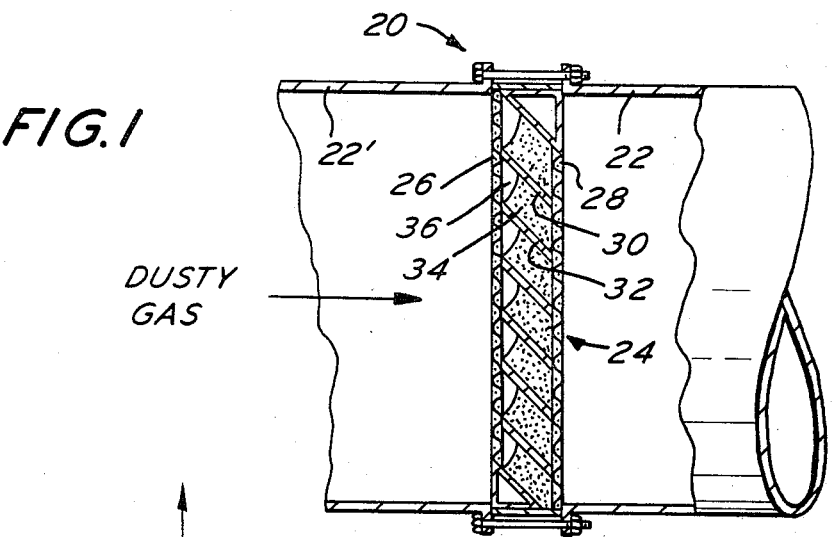
FIG. 1
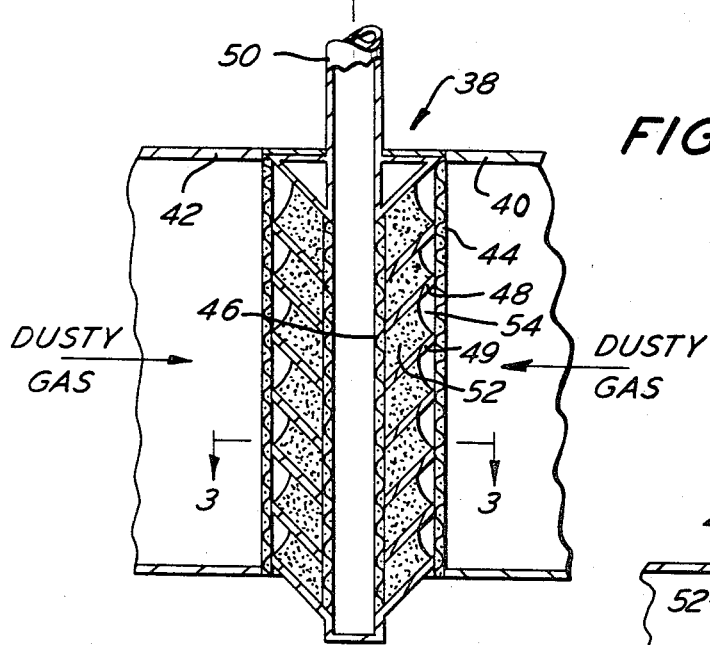
FIG. 2
FIG. 3
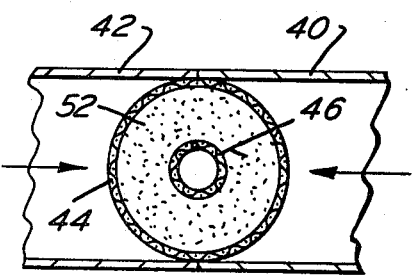
INVENTOR
FREDERICK A. ZENZ
BY Seidel & Gonda
ATTORNEYS.

United States Patent Office 3,410,055
Patented Nov. 12, 1968

3,410,055
EXPANDABLE BED FILTER AND METHOD
Frederick A. Zenz, Roslyn Harbor, N.Y., assignor to The Ducon Company, Inc., Mineola, N.Y., a corporation of New York
Filed Oct. 25, 1966, Ser. No. 589,433
4 Claims. (Cl. 55—96)

ABSTRACT OF THE DISCLOSURE

Apparatus and method for filtering particulates by means of parallel non-communicating channels containing granular filter media in an amount less than the capacity of the channels so as to leave an air gap into which the filter media may be fluidized by reverse gas pressure for purposes of cleaning the filter media.

---

This invention relates to an expandable bed filter arranged for the removal of particulates from a fluid stream.

A filter of the present invention can be used for the removal of either solid or liquid particulates and is particularly designed for use with high temperature gas streams. Thus, the filter of the present invention is particularly useful for removal of particulates from, but is not limited to, filtering out particulates having a temperature in excess of 2000° F. There exists voluminous prior art relating to the use of a granular media filter, generally sand, as well as fiber medium filters. The present invention is directed to a granular media filter having certain attributes of a fiber medium filter.

In accordance with the present invention, an expandable bed filter is provided having a plurality of parallel channels which do not communicate with one another. Within each channel, the granular media occupies a volume which is about 75% or more of the total volume of the channel. The remainder of the volume of each channel is an air gap. I have found that this is one of the basic deficiencies of the prior art in that they do not provide a substantial air gap in association with a granular media filter. The air gap provides a space into which a portion of the granular media may move, on backwashing and facilitate fluidizing of the media therein. The contaminant from the gas stream is entrapped in interstices between the particles making up the filter media. The backwash air which moves the filter media, fluidizes the filter media, and removes the contaminant from the filter media.

I have found that the provision of an air gap in the various channels is essential. I have found that it is desirable in some environments to prevent the gas stream from sneaking through the filter by partially filling the air gap and/or filter media with the contaminant to be removed from the gas stream.

I have found that there is no critical gas velocity. Thus, with bag filters the velocity of 2 to 3 cubic feet per minute per square foot of filter area cannot be exceeded. With the filter of the present invention, velocities as high as 100 cubic feet of gas per square foot of filter surface area have been used in connection with the same type of filtering, namely fine fume collection. Where coarse collection is involved, the gas velocities in the filter of the present invention can be higher.

Heretofore, filters employing granular media, usually sand, have been provided in many configurations and designs, but all such designs of which I am aware are marked by serious operating deficiencies or uneconomical means of cleaning the filter medium. These consequences have severely limited the use of granular media filters which otherwise would be quite suitable for many applications.

One prior art arrangement confines a vertical panel of sand (which term will be used hereinafter as typifying any suitable granular media) between two vertical screens. The fluid stream passes through the screens and sand panel so that the particulates filtered therefrom form a filter cake on the inlet face of the panel. The particulates are removed either by a cyclic reverse blast of gas or else the entire sand panel is physically removed and replaced by a clean sand panel. The latter is obviously impractical in a commercial installation and the former suffers the disadvantage that dust particles inevitably penetrate into the interstices of the sand grains and build up a residual pressure drop so that when blasted with a reverse flow of gas the sand is never fully cleaned and hence never returns to its original pressure drop characteristics. Upon repeated forward and reverse flow of gas the filter suffers a continually rising pressure drop and/or reduced capacity. Porous metal filters which consist of metallic grains sintered to form porous sheets suffer this same eventual choking characteristic and are, in addition, subject to cracking due to thermal shock when used at high temperatures.

Another prior art sand filter utilizes a vertical sand filter that is confined between oppositely disposed louvres the slats of which are inclined downwardly towards each other. The sand is retained by the louvre slats at its angle of repose and is kept moving downwardly through the filter by feeding sand continuously from an overhead hopper and continuously drawing it off at the bottom. This continuous replenishing with fresh sand maintains a uniform condition of the filter and allows non-cyclic operation. However, the collected particulates must be separated from the drawn-off sand (for example, by vibratory screening) and the cleaned sand returned to the overhead hopper. This additional burden imposed by the sand screening and handling operation is again highly impractical. This is particularly true in high temperature applications where the sand is hot. Moreover, this arrangement cannot operate with very dirty sand least the collected dust particles penetrate the filter during the downward movement of the sand. This follows since the configurations of the interstices continuously change when the sand is in motion and thereby allow dust to be blown through.

Another prior art arrangement is similar to the one just described except that the sand is not continuously moved through the filter panel. Rather a reverse fluid blast removes all of the sand plus the filter cake from the panel or perhaps leaves some residual and essentially clean sand behind. Following the reverse blast of cleaning gas, fresh sand is admitted from an overhead bin to fill the panel and the filtering operation begun again.

Both arrangements employing louvres suffer the disadvantage of requiring relatively low dusty gas face velocities lest the sand medium be blown off the louvre slats. If a coarse sand grain is used, in order to permit higher operating velocities and hence smaller equipment sizes, then the filtering efficiency decreases because the sand interstices are also large. If a fine sand grain is used to increase the filtering efficiency then pressure drop increases and equipment size must also increase to avoid blowing away the sand medium itself.

Still another prior art arrangement employs a horizontal sand panel resting on a horizontal retaining screen. Filter cake builds up on the underside of the screen and to some extent permeates the first few layers of sand grains. The filter operates cyclically and is cleaned by a reverse blast of gas while the entire bed assembly is vibrated mechanically. The vibration causes intergranular movement and hence reorientation of the interstices so that a reverse flow of gas can be effective in sweeping collected particulates out of the interstices and thereby return the filter to its initial state. Though enjoying the advantage of no sand handling auxiliary apparatus, the arrangement suffers the disadvantage of larger space requirements for vibration of heavy sand masses and the inability to operate at exceedingly high temperatures because of the required flexibility at some support point to permit vibration.

The object of this invention is to provide an improved granular media filter whose operating efficiency is not materially affected by inordinate pressure drops and which is readily cleaned of collected particulates without the handling or circulation of the filter medium.

In carrying out the invention there is provided a vertical louvred panel having an inlet screen and an outlet screen immediately adjacent the louvre slats. A granular filter media, such as sand, is placed in each filter section formed by two adjoining slats and the inlet and the outlet screens, both of which are of a mesh to retain and not pass the filter sand. Each section is approximately 75% filled with sand which is retained therein by the outlet screen. The inlet surface of the sand is disposed at its angle of repose.

The arrangement is such that the dirty fluid stream passes through the inlet screen, through the filter media which collects the contaminating particles, and then exits through the outlet screen as a clean fluid. After a filter cake builds up on the filter media, a reverse flow of fluid expands the filter media and blows the particulates out through the inlet screen whereupon they are collected and removed. When the reverse fluid flow is arrested the filter media settles back against the outlet screen ready again to perform its filtering action.

An advantage of the present invention is that the filter media does not have to be circulated or handled since it always is retained by the screens in the filter sections. Also, there is no limit to the fluid velocity since the filter media is confined by the inlet and the outlet screens. A further advantage is that the filter may be used to treat exceedingly high temperature fluids since it is essentially a static system that requires no physical movement of structural members of the filter; only the filter media itself moves when expanded in the cleaning cycle.

It is an object of the present invention to provide an expandable bed filter wherein a granular media is provided with an air gap into which the media may expand in much the same fashion as cloth bag filters are capable of flexing.

It is another object of the present invention to provide an expandable bed filter for use with high temperature gas streams, which filter is simple, reliable, highly efficient, while being inexpensive to install and maintain.

It is another object of the present invention to provide an expandable bed filter comprised of granular media arranged in a manner whereby particulates collected by the media can be readily removed by backwashing effected by a sharp reverse blast of gas, as commonly used for backwashing porous metal or cloth bag filters.

It is another object of the present invention to provide novel filtering apparatus and method wherein the filter media is fluidized by backwash gas for purposes of cleaning the media.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a sectional view of one embodiment of the filter of the present invention.

FIGURE 2 is a sectional view of another embodiment of the filter of the present invention.

FIGURE 3 is a sectional view taken along the line 3—3 in FIGURE 2.

Referring to FIGURE 1, there is illustrated one expandable bed filter device of the present invention designated generally as 20. Device 20 includes a filter 24 removably clamped between conduit sections 22 and 22'. Filter 24 includes an inlet screen 26 and an outlet screen 28.

The space between the screens 26 and 28 is divided into a plurality of parallel channels. For example, one channel is defined by the imperforate slats 30 and 32. A granular filter media 34, such as sand, is disposed within each of the channels and in abutting contact with the outlet screen 28. The sand assumes its natural angle of respose thereby leaving a void or air gap 36. Thus, the channels are not completely filled with sand 34. The air gap 36 constitutes a space into which the sand 34 can be induced to move for purposes of fluidization upon backwash.

The provision of the air gaps 36 enables the filter 24 to be cleaned by a fluidized flexing or expansion in much the same manner that a fiber filter bag is cleaned. The filter screens 26 and 28 prevent loss of the filter media 34 and thereby circumvent the necessity for auxiliary handling equipment. Also, the screens 26 and 28 remove limitations on the capacity imposed by grain carrying velocities so that the granules of the sand 34 cannot be blown out of the filter panel.

In FIGURE 1, the filter particulates removed from the incoming dirty gas stream would be collected on the surface of the filter media 34 disposed at its angle of repose. The filter media 34 can be cleaned by a reverse blast of gas. Initially, the reverse flow of gas lifts the filter media 34 in each channel to expand the same into the air gap 36 and fluidize the media 34 thereby enlarging the interstices. The individual grains of sand rub against each other thereby permitting the collected particulates to be blown out through the inlet screen 26.

The inlet screen 26 also serves to accumulate particulates removed from the dirty gas stream by impingement thereon. Depending upon the nature of the particulates, the screen 26 may build its own filter cake and in such an instance provides a two stage filter. Particulates collected as a cake on the screen 26 are easily removed by the reverse flow of gas.

It has been found in practice that in cleaning the granular media 34 with a reverse flow of gas sufficient to fluidize the grains, there occurs a certain degree of mixing of the filtered particulates in the grains of the filter media. By prolonged fluidizing, the filter media can be completely cleansed of the collected particulates. Obviously it is desirable to minimize the quantity of reverse flow of gas. The mixing of collected particulates and the filter media 34 resulting from limited reverse flows has been found in practice to be helpful rather than detrimental to the performance of the filter 24. As a result of this mixing, a certain amount of collected particulates penetrate the filter media 34 far enough to reach the screen 28.

After the particulates resting in the first layer of the filter media 34 adjacent to screen 28 have been blown off, those remaining in the interstices of filter media 34 cannot escape and in fact increase the collection efficiency in the remainder of the cycle since the composite of coarse filter media 34 and the entrapped collected particulates presents a maze of still smaller interstices to the incoming dirty gas stream. After the first layer of grains of the filter media 34 adjacent the screen 26 are saturated with collected particulates and a filter cake begins to form, it is the filter cake which effectively acts to clean the dirty gas stream in the remainder of the cycle.

In FIGURE 1, the incoming stream is first exposed to the gaps 36 after initially passing through the screen 26. It is within the scope of the present invention to reverse the direction of flow for the dirty gas stream. Thus, the screen 28 may be an inlet screen. In this arangement, the face velocity is limited to the rate which would fluidize the filter media 34 or lift it away from the screen 28 and thus cause breakthrough of dust particles into the clean side of the filter panel.

In FIGURE 2 there is illustrated another embodiment of the present invention designated generally as 38. The filter device 38 includes a pair of rectangular conduits 40 and 42 removably connected at their adjacent ends to an inlet or outer screen 44 which is circular in cross-section. An inlet or outlet screen 46 also circular in cross-section is disposed within screen 44. Screens 46 and 44 are interconnected by imperforate concave slats 48 and 49. A conduit 50 may be connected to screen 46 to remove the clean gas accumulating therein. A filter media 52, corresponding to filter media 34, is disposed between adjacent slats in a similar manner as described above in connection with FIGURE 1 so as to provide voids or air gaps 54.

The filter device 38 performs in the same manner as described above in connection with filter device 20. It will be obvious that the present invention may be utilized to filter liquid streams as well as gaseous streams and that it may be used with an appropriate granular filter media to absorb gaseous constituents from a mixed gas stream.

Thus, it is essential to the present invention that the granular filter media be associated in a channel with a void or air space into which the granular media may be fluidized by a reverse flow of air or gas for removing accumulated particulates without losing the granular media. It is to be noted that the upper edge of the slats always overlaps the lower edge of the slat thereabove in each of the embodiments of the present invention.

The channels preferably have a width commensurate with the intensity of reverse gas flow so that all of the filter media is uniformly fluidized during backwashing and is equally distributed across the channels after backwashing. By way of example and not by way of a limitation, it has been found that uniform fluidization and distribution occur when the channels have a width of 12 inches and blasts of backwash air of 1.75 cubic feet at 50-60 p.s.i. are used.

I claim:

1. A filter device comprising first and second upright spaced screens, said screens being circular with the second screen being disposed within said first screen, imperforate frustoconical slats extending between the screens to define substantially parallel non-communicating channels disposed at an acute angle with respect to the screens, said slats being arranged so that the upper edge of one slat is above the lower edge of the next adjacent slat thereabove, and a granular filter media within the channels, said media occupying a major portion of the space of each channel but substantially less than the entire volume of the channels so as to leave an air gap, the filter media having its lower periphery as determined by an angle of repose adjacent the upper edge of its respective slat, means including said air gaps for fluidizing the filter media by a reverse flow gas stream when it is desired to clean the filter media of accumulated particulates.

2. A device in accordance with claim 1 wherein the air gap occupies approximately 25 percent of the volume of its channel.

3. A method of filtering high temperature particulates using substantially parallel non-communicating channels between and at an acute angle with respect to spaced upright filter screens with a granular filter media only partially filling each channel, thereby leaving an air gap on the inlet side of the filter comprising the steps of exposing the filter media and air gap to a dirty gas stream containing particulates to be removed, removing particulates from the stream by the filter media, cleaning the particulates from the filter media by uniformly fluidizing the filter media into the air gap by a reverse gas pressure while the filter media is disposed within its channel, and uniformly returning the filter media across the width of its respective channels after fluidizing so that it may again be exposed to a dirty gas stream.

4. A method in accordance with claim 3 including the step of limiting the size of the air gap so that the air gap constitutes approximately 25 percent of the volume of its respective channel.

References Cited

UNITED STATES PATENTS

| | | | |
|---|---|---|---|
| 989,665 | 4/1911 | Tixier | 210—268 X |
| 2,145,049 | 1/1939 | Heuberger | 55—517 X |
| 2,488,493 | 11/1949 | Evans. | |
| 2,493,356 | 1/1950 | Mercier et al. | 55—474 X |
| 2,639,000 | 5/1953 | Edwards | 55—390 X |
| 3,016,147 | 1/1962 | Cobb et al. | 210—275 |
| 3,296,775 | 1/1967 | Squires | 55—387 X |

FOREIGN PATENTS

| | | |
|---|---|---|
| 26,145 | 4/1923 | France. |
| 1,062,580 | 12/1953 | France. |
| 1,146,213 | 5/1957 | France. |
| 1,176,086 | 11/1958 | France. |
| 381,500 | 5/1924 | Germany. |
| 409,942 | 2/1925 | Germany. |
| 522,573 | 4/1931 | Germany. |
| 984,844 | 3/1965 | Great Britain. |
| 91,075 | 12/1937 | Sweden. |

HARRY B. THORNTON, *Primary Examiner.*

B. NOZICK, *Assistant Examiner.*